United States Patent [19]
Takashina et al.

[11] Patent Number: 5,444,886
[45] Date of Patent: Aug. 29, 1995

[54] APPARATUS FOR CLEANING A PIPING

[75] Inventors: Shoichi Takashina, Hannan; Koichi Ishihara, Habikino, both of Japan

[73] Assignee: Fuji Oil Co., Ltd., Osaka, Japan

[21] Appl. No.: 115,712

[22] Filed: Sep. 3, 1993

[51] Int. Cl.$^6$ .................................... B08B 9/04
[52] U.S. Cl. ........................ 15/3.51; 15/104.062
[58] Field of Search .............. 15/3.5, 3.51, 104.062; 165/95

[56] References Cited

U.S. PATENT DOCUMENTS

| | | | |
|---|---|---|---|
| 3,028,996 | 4/1962 | Ellett | 15/104.062 |
| 3,120,118 | 2/1964 | Boyle | 15/104.062 |
| 3,524,466 | 8/1970 | Van Scoy | |
| 4,917,176 | 4/1990 | Shimada | 15/104.062 |
| 5,113,895 | 5/1992 | Devehat | 15/3.5 |

FOREIGN PATENT DOCUMENTS

| | | |
|---|---|---|
| 0266097 | 5/1988 | European Pat. Off. |
| 0375533 | 6/1990 | European Pat. Off. |
| 2142910 | 3/1973 | Germany. |
| 3517751 | 11/1986 | Germany. |
| 4010855 | 10/1991 | Germany. |
| 59-142085 | 9/1984 | Japan. |
| 62-087836 | 4/1987 | Japan. |
| 62-38040 | 8/1987 | Japan. |
| 62-144593 | 9/1987 | Japan. |
| 2-095487 | 4/1990 | Japan. |
| 1066640 | 4/1967 | United Kingdom. |
| 88/03246 | 5/1988 | WIPO. |

Primary Examiner—Edward L. Roberts, Jr.
Attorney, Agent, or Firm—Wenderoth, Lind & Ponack

[57] ABSTRACT

An apparatus designed to efficiently and positively clean a main piping not only totally, but also partially by the reciprocation of a pig. The cleaning apparatus is provided with a launcher (4) for projecting a pig (1) and a catcher (36) for receiving the pig (1) at both ends of a main piping (37). A compressed gas is supplied from a feed nozzle of the launcher to thereby send the pig to the catcher (36). In consequence to the arrival of the pig, the compressed gas is discharged through a discharge nozzle (29) of the catcher (36), when the pressure is decreased and the pig is accordingly stopped. The decrease of the pressure is detected by a pressure sensor (33) of the launcher (4). When the pig arrives at the catcher (36), it is detected by a pressure sensor (33) of the catcher (36). The compressed gas is supplied from a feed nozzle (22) of the catcher (36) based on the detecting signal of the pressure sensor (33) of the launcher (4), to thereby send the pig towards the launcher (4). The reciprocating motion of the pig is executed by opening/closing electromagnetic valves of the launcher (4), catcher (36), main piping (37) and branch pipes (41a, 41b) by means of a controller.

7 Claims, 11 Drawing Sheets

APPARATUS FOR CLEANING A PIPING

BACKGROUND OF THE INVENTION

1. Field of the Invention

The present invention relates to a cleaning apparatus designed to remove residues such as fats and oils, chemical substances, medicines and the like in piping by movement of a pig.

2. Description of the Prior Art

Japanese Patent Laid-open Publication No. 62-38040 (38040/1987) discloses an example of a cleaning apparatus to remove residues from piping, which includes a cylindrical body constituting a catcher to stop a pig projected from a launcher, and a separating mechanism having a jet port. In the cleaning apparatus, a compressed fluid is discharged through the jet port to thereby stop the pig and, the stopped pig is removed after the cylindrical body is opened separately by the separating mechanism.

Another example of the above type apparatus is described in Japanese Utility Model Laid-open Publication No. 59-142085 (142085/1984), which is provided with a launcher and a catcher, wherein an outlet of a high pressure gas in the catcher is positioned so as to be clogged by a pig.

Meanwhile, in a pig sensing apparatus revealed in the Japanese Utility Model Laid-open Publication No. 62-144593 (144593/1987), a sensing rod with a sensing plate at the front end thereof is slidably mounted in a hole formed in a blind patch at the end part of a pipe, and a branch pipe is provided at the end of the piping to let out the discharged matter.

The pig is moved only in one direction in the conventional apparatuses mentioned above. Therefore, not only the removing efficiency of residues adhered to the wall of the piping is poor, but also it is annoyingly necessary to remove the pig sent to the catcher and reload the pig in the launcher every time the pig is projected from the launcher, resulting in complication of the cleaning work.

According to an apparatus disclosed in the Japanese Patent Laid-open Publication No. 62-87836 (87836/1987), a speed of the pig movement is controlled so that it can be stopped at optional positions. Specifically, the pig has a through-hole bored in the main body thereof, a valve plate for opening/closing the through-hole and an actuator for activating the valve plate. The arrangement is not advantageous, however, since it requires use of the pig of the complicated structure as above.

On the other hand, the Japanese Patent Laid-open Publication No. 2-95487 (95487/1990) shows a cleaning method, where a plurality of pigs are inserted into piping while a solvent is sealed between the pigs, to thereby clean the interior of the piping as the pigs are run through the piping. In this cleaning method, since a solvent is sealed in the plurality of pigs, the cleaning work becomes intricate, with a fear that the piping will be contaminated with the solvent thereinside. Therefore, the cleaning method is limited only to use in a transportation pipeline for crude oil or heavy oil.

Since it is necessary for the pig to run in the entire piping between the launcher and catcher according to the conventional apparatuses or method as above, it is impossible to clean only a part of the piping. In the case, for example, where branch pipes are connected at a plurality of points of a main pipe connecting the launcher and catcher and each branch pipe is connected with a tank, if a liquid is transported into and stored in a first tank at the side of the launcher, the pig must be moved within the entire main piping to clean the main piping totally although the main piping at the lower side of the stream of a first branch pipe need not necessarily be cleaned. In such a case as above, the residue is transferred to a second branch pipe located at the lower side of the stream relative to the first branch pipe in accordance with the running of the pig. Consequently, when a liquid is supplied to a second tank at the lower side of the stream relative to the first branch pipe through the cleaned main piping and the second branch pipe, the liquid in the second tank may be contaminated with the residue in the second branch pipe.

In the meantime, if the conventional apparatus or method described above is to be applied to a duct system constituting main piping and branch pipes branching from the main piping to tanks, the pig may be sometimes erroneously brought into the branch pipe. That is, as the pig is an elastic body transferred by a high pressure fluid, the pig may be pressed into the tank through the branch pipe during cleaning particularly when a liquid is transported and stored in a plurality of tanks. Therefore, the pig must be removed from the tank and mounted to the launcher again. This makes the cleaning work troublesome.

SUMMARY OF THE INVENTION

An essential object of the present invention is, therefore, to provide a cleaning apparatus for piping where a pig is reciprocated within a pipe conduit, so that the interior of the pipe conduit can be efficiently cleaned.

A further object of the present invention is to provide a cleaning apparatus for piping which restricts the movement of a pig to branch pipes of a pipe conduit, to thereby positively clean the interior of a main pipe.

A still further object of the present invention is to provide a cleaning apparatus for piping capable of cleaning a main pipe either totally or partially.

In order to achieve the aforementioned objects, according to the present invention, a cleaning apparatus for piping is provided with a pig arranged in a pipe conduit, a launcher so disposed as to be communicated with one end of the pipe conduit for launching the pig using compressed fluid, and a catcher so disposed as to be communicated with the other end of the pipe conduit to receive the transferred pig. Moreover, the cleaning apparatus is equipped with a sensor to detect when the pig reaches the catcher, and a control means for controlling the supply of the compressed fluid based on a detecting signal from the sensor to thereby send the pig from the catcher towards the launcher.

According to the cleaning apparatus of the present invention, when it is detected by the sensor that the pig projected from the launcher has arrived at the catcher, the control means supplies the compressed fluid in response to the detecting signal from the sensor, thereby sending the pig back to the launcher. In other words, the pig can be reciprocated between the launcher and the catcher. The residue in the pipe conduit can be removed more efficiently during the going-and-return trip of the pig.

It is to be noted here that each of the launcher and catcher may be provided with a sensor to detect the arrival of the pig and a control means for feeding a compressed fluid on the basis of the detecting signal of the sensor to thereby send the pig in a direction opposite to that when the pig is advanced towards the catcher or launcher. In this arrangement, the pig can be pressed forward both from the side of the launcher and from the side of the catcher in the reciprocating motion, and further allowed to run at least once in one direction. Therefore, the interior of the pipe conduit can be cleaned much better.

The pipe conduit comprises a main piping between the launcher and catcher, and branch pipes branching from the main piping. A double pipe comprised of an outer pipe and an inner pipe constituting the main piping is provided at the branched part of the branch pipe. A communicating hole communicated with the branch pipe may be formed in the inner pipe to restrict the invasion of the pig into the branch pipe. It becomes consequently possible to supply a fluid to the branch pipe through the communicating hole of the inner pipe and at the same time, prevent the pig from entering the branch pipe.

Moreover, each of the launcher and catcher may be provided with a discharge port through which a compressed fluid is discharged to stop the pig, a sensor to detect the arrival of the pig at the catcher or launcher, a feed port for feeding a compressed fluid to press the pig forward, and also the control means may be provided with a valve mechanism for opening/closing the channel of the feed port and discharge port. The valve mechanism, upon receipt of a start signal to start the cleaning work, closes the channel at the discharge port of the launcher and the channel at the feed port of the catcher, with opening of the channel at the feed port of the launcher and the channel at the discharge port of the catcher. At the same time, in response to the detecting signal of the sensor of the launcher, the valve mechanism opens/closes the channels at the feed port of the launcher, at the discharge port of the launcher, at the discharge port of the catcher and at the feed port of the catcher, reverse to the above when the cleaning work is started. Accordingly, the pig can be automatically reciprocated as the valves are controlled to be opened/closed by the control means.

In a further aspect, according to the present invention, a cleaning apparatus of a piping is provided with launchers so disposed as to be communicated with both ends of a main piping to send a pig by means of compressed fluid, and branch pipes branching from the main piping. A double pipe comprised of an outer pipe and an inner pipe which is longer than the pig is arranged at the branched part of the branch pipe. A communicating hole is formed in the inner pipe constituting the main piping, which is communicated with the branch pipe and restricts the invasion of the pig into the branch pipe. The cleaning apparatus of the present invention is also provided with a sensor which detects the arrival of the pig from the launcher at the branched part and a control means for feeding a compressed fluid from the other launcher to send the pig towards the one launcher based on the detection signal of the sensor.

In the above cleaning apparatus, when the pig projected from one launcher reaches the branched part and passes through the communicating hole of the inner pipe, the compressed fluid is introduced into the branch pipe through the communicating hole, thereby causing the sudden decrease of pressure. The decrease of pressure which corresponds to the fact that the pig arrives at the branched part is detected by the sensor. Subsequently, the compressed fluid is supplied from the other launcher based on the detecting signal of the sensor, and the pig is returned towards the one launcher.

The launchers provided at both ends of the main piping have feed ports to supply the compressed fluid. At least one of the launchers may be provided with a discharge port to discharge the compressed fluid to thereby stop the pig, and a sensor for detecting the arrival of the pig at the branched part. The control means of the apparatus has a valve mechanism.

The valve mechanism mentioned above opens the channels of the feed port of one launcher and of the branch pipe to which a fluid to be stored is transported, in response to a start signal to start the cleaning work. At the same time, the valve mechanism closes the channels at the discharge port of the one launcher, of the main piping downstream of the branched part of the branch pipe and of the feed port of the other launcher. Moreover, in response to the output signal from the sensor of the one launcher, the valve mechanism opens the channels at the discharge port of the one launcher, of the main piping and of the feed port of the other launcher, with closing of the channels of the feed port of the one launcher and the branch pipe.

Owing to the presence of the control means in the above cleaning apparatus, the pig can be automated to run in the main piping between the one launcher and the branched part as the valve is opened/closed by the valve mechanism controlled by the control means. Accordingly, the main piping can be partially cleaned.

According to a different arrangement of the cleaning apparatus, the launchers at both ends of the main piping are provided respectively with a feed port to supply a compressed fluid to transfer the pig and a discharge port to discharge the compressed fluid to thereby stop the pig. It may be further designed that one launcher is provided with a sensor to detect the arrival of the pig at the branched part, and the other launcher is provided with a sensor to detect the arrival of the pig at the one launcher. The valve mechanism constituting the control means opens the channels of the feed port of the one launcher, the branch pipe to which a fluid-to-be-stored is transported and the discharge port of the other launcher in response to the start signal to start the cleaning work, while closing the channels of the discharge port of the one launcher, main piping downstream of the branched part of the branch pipe and feed port of the other launcher. At the same time, the valve mechanism opens, in response to the detecting signal from the sensor of the one launcher, the channels of the discharge port of the one launcher, main piping and the feed port of the other launcher, with closing of the channels of the feed port of the one launcher, the branch pipe and the discharge port of the other launcher.

Since the valves are controlled to be opened/closed by the control means, it is possible to reciprocate the pig in the whole of the main piping, and also only at a necessary part in the main piping. The cleaning efficiency is thus enhanced.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

A preferred embodiment of the present invention will be more fully described with reference to the accompanying drawings.

Figure 1:
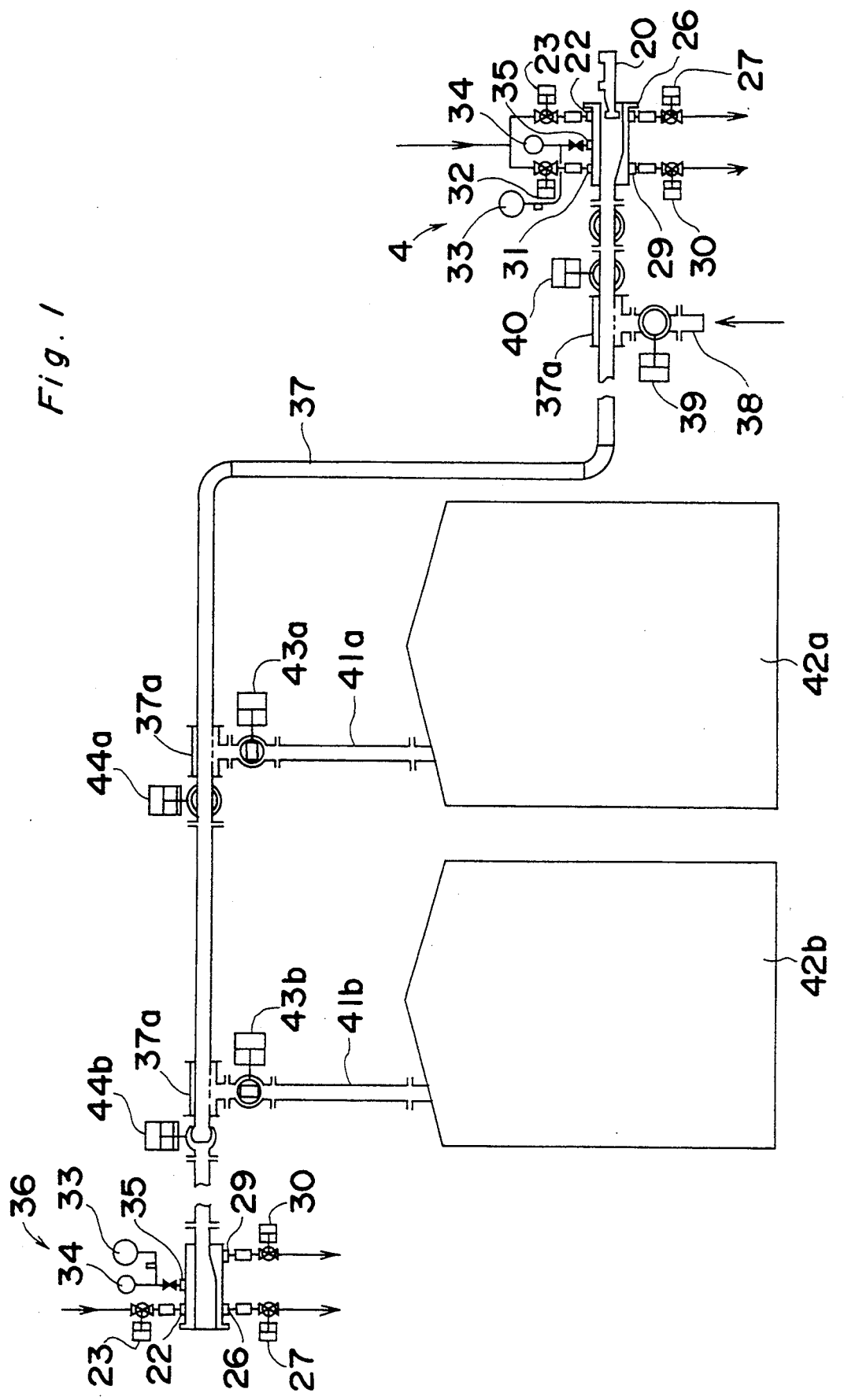
FIG. 1 is a schematic diagram of a cleaning apparatus for piping according to one embodiment of the present invention.
Figure 2:
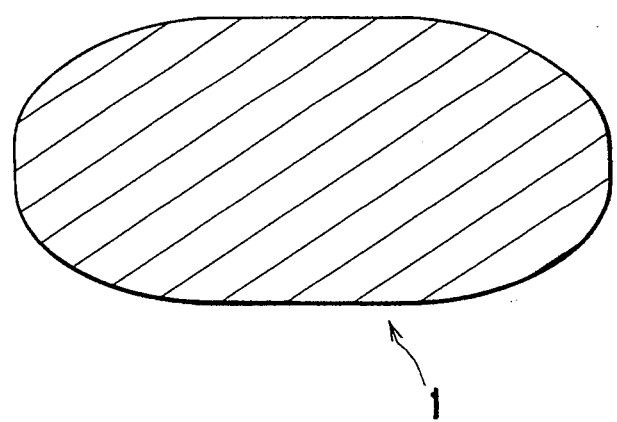
FIG. 2 is a sectional view of a pig.
Figure 3:
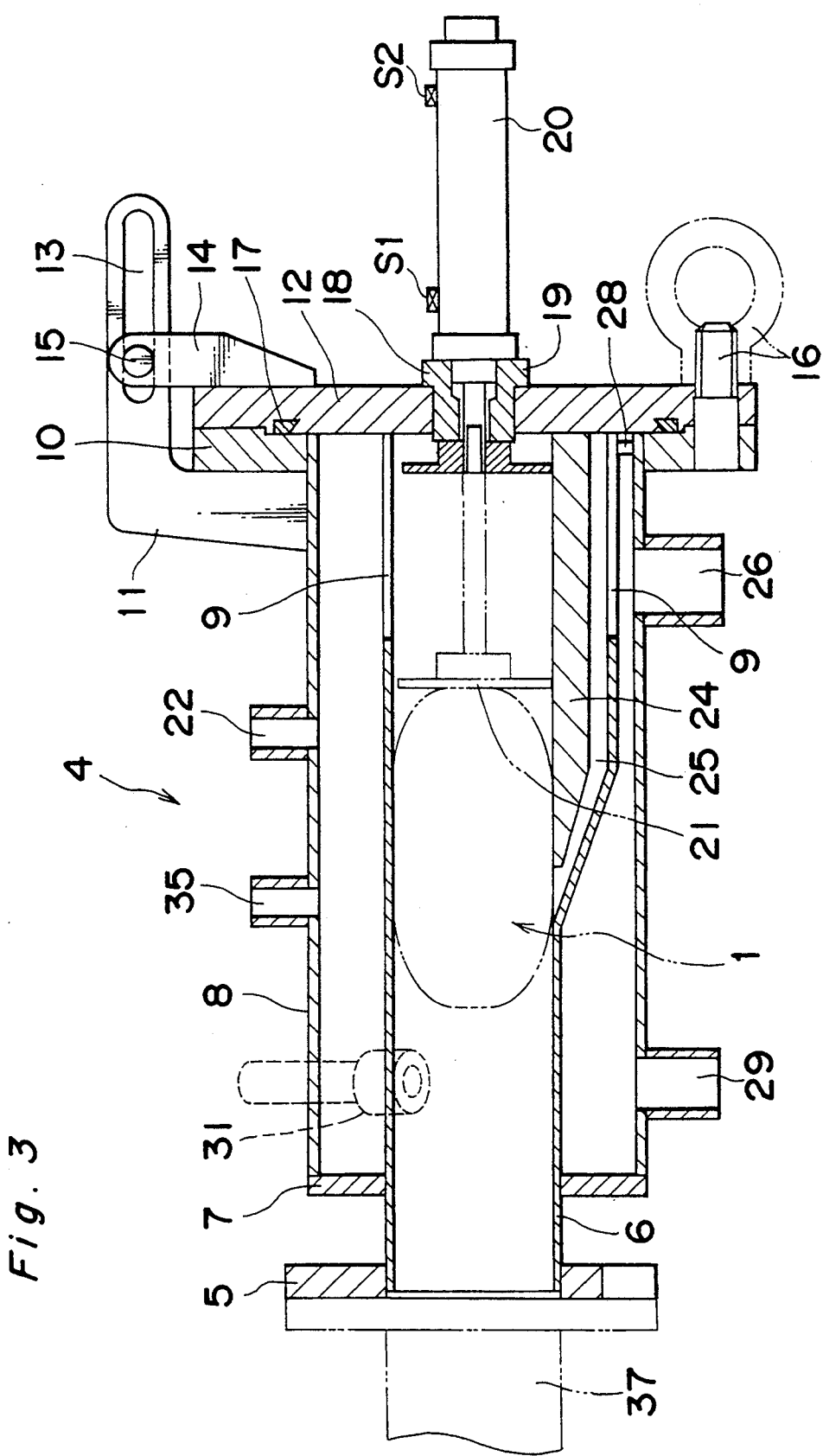
FIG. 3 is a sectional view of a launcher.
Figure 4:
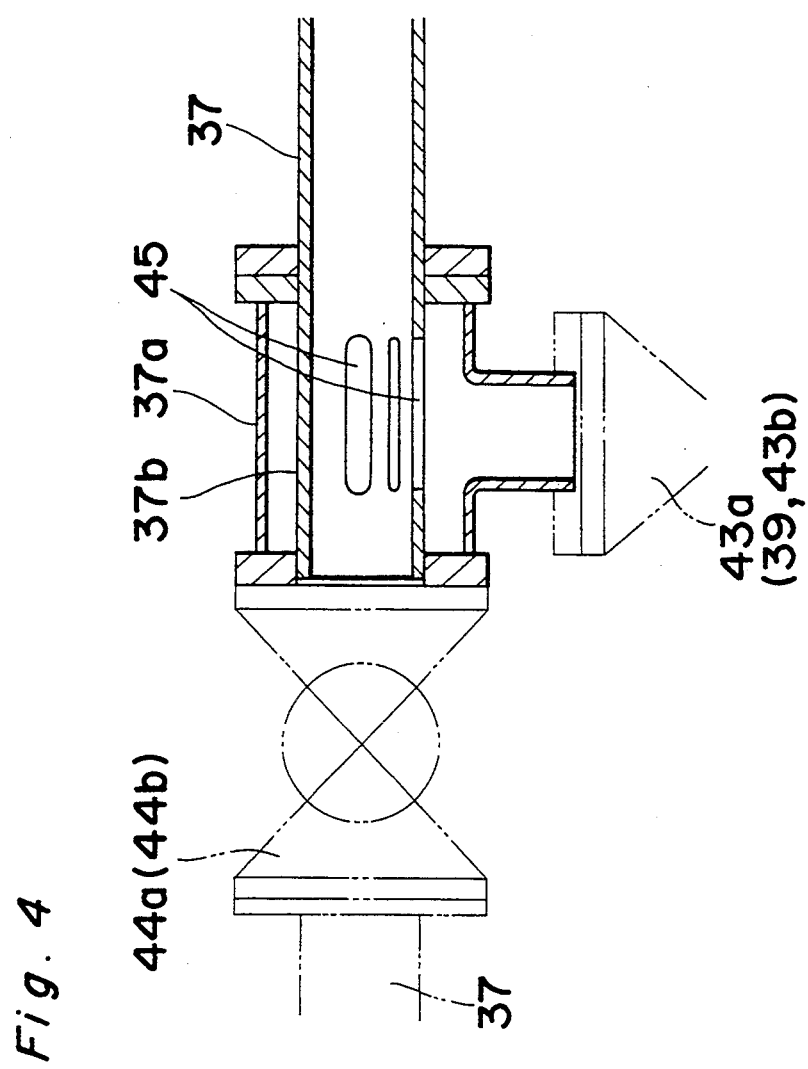
FIG. 4 is a sectional view of a pipe conduit at a branched part.

FIG. 1 is a schematic view of a cleaning apparatus for piping according to one preferred embodiment of the present invention, FIG. 2 is a sectional view of a pig employed in the apparatus of FIG. 1, FIG. 3 is a sectional view of a launcher of the apparatus, and FIG. 4 is a sectional view of a pipe conduit at a branched part of the piping.

The cleaning apparatus for cleaning piping of the embodiment is provided with a launcher 4 which presses forward a pig 1 formed of an elastic material such as rigid polyurethane by means of a compressed gas, main piping 37 communicated with the launcher 4, a catcher 36 communicated and connected with the other end of the main piping 37 for receiving the pig 1 sent by the launcher 4, and a plurality of branch pipes 41a, 41b branching out from a plurality of positions of the main piping 37 to be connected to respective tanks 42a, 42b.

The pig 1 is held elastically in contact with the inner wall of the main piping 37. The inner diameter of the main piping 37 is substantially the same as that of the pig 1 so that the pig 1 is able to elastically contact the main piping 37 without the reciprocal motion of the pig 1 being limited.

The launcher 4 is longer than the pig 1 in the axial direction. As shown in FIG. 3, the launcher 4 is mounted to the main piping 37 via a flange 5 at one end thereof, having an inner cylinder 6 of substantially the same inner diameter as that of the main piping 37 and an outer cylinder 8 attached to the inner cylinder 6 via an end plate 7 at one end. A communicating hole 9 is formed at the rear end of the inner cylinder 6 to communicate with the outer cylinder 8. A flange 10 of the outer cylinder 8 is held between a bracket 11 and an end plate 12 to seal the opening portions of the inner and outer cylinders 6, 8. The end plate 12 is pressed in contact with the flange 10 when a pressing member 14 which is movable along a guide hole 13 formed in the extended part of the bracket 11 is fastened by a bolt and nut mechanism 15. The end plate 12 is secured to the flange 10 of the outer cylinder. 8 also by another bolt and nut mechanism 16 at a different point. An O-ring 17 is interposed between the flange 10 and end plate 12 so as to enhance the sealing function.

An air cylinder 20 which is movable back and forth in the inner cylinder 6 is installed in a seat 18 formed in the end plate 12 at the rear end of the launcher 4. A flange 21 at the front end of the air cylinder 20 within the inner cylinder 6 is formed so as to press the pig 1 forward. The stopping position of the flange 21 of the air cylinder 20 in the forward direction corresponds to the position where the pig 1 is projected. The air cylinder 20 has a first limit switch SW1 at the position corresponding to the projecting position of the pig 1 and a second limit switch SW2 mounted corresponding to the retracting position of the flange 21. A controller (not shown) as a control means is activated on the basis of the detecting signal of the second limit switch SW2, thereby opening/closing each electromagnetic valve in the piping.

A feed nozzle 22 for feeding a compressed gas is connected at the rear end of the launcher 4. The feed nozzle 22 is communicated with the inner cylinder 6, which is opened/closed by an electromagnetic valve 23.

In the lower part at the rear end within the cylinder 6 is placed a spacer 24 having substantially the same inner diameter as that of the main piping 37. The spacer 24 stretches from the inner cylinder 6 by a length equal to or longer than the length of the pig 1 in the axial direction. The pig 1 loaded within the inner cylinder 6 is pressed to the projecting position by the air cylinder 20 as described earlier.

Further, there is provided a recessed part in the lower part at the rear end in the inner cylinder 6 to form a channel 25 communicated with the inner cylinder 6 by way of the spacer 24. The flow channel 25 is communicated with a liquid discharge nozzle 26 of the outer cylinder 8 through the communicating hole 9. When the pig 1 runs, the residue removed from the main piping 37 is discharged through the discharge nozzle 26. The channel of the discharge nozzle 26 is opened/closed by an electromagnetic valve 27. The channel 25, communicating hole 9 and discharge nozzle 26 define a discharge mechanism to discharge the residue in the main piping 37 removed by the run of the pig 1. A sealing member 28 is set at the side of the rear end of the inner cylinder 6 and outer cylinder 8 so as to prevent leakage of the residue.

A gas discharge nozzle 29 is connected with the launcher 4 at the side more frontward than the pig 1 at the projecting position, which is opened/closed by an electromagnetic valve 30. The gas discharge nozzle 29 is communicated with the channel 25 and communicating hole 9 via the electromagnetic valve 30.

The electromagnetic valves 23, 27, 30 of the feed nozzle 22, liquid discharge nozzle 26 and gas discharge nozzle 29 are opened or closed oppositely of one another. That is, when the electromagnetic valve 23 of the feed nozzle 22 is opened, the electromagnetic valves 27, 30 are closed.

The pig 1 sent to the projecting position by the air cylinder 20 in the launcher 4 is projected towards the main piping 37 when the electromagnetic valves 27, 30 of the liquid discharge nozzle 26 and gas discharge nozzle 29 are closed, with the electromagnetic valve 23 of the feed nozzle 22 being opened, to thereby supply the compressed gas behind the pig 1. In other words, the launcher 4 is equipped with a pressing mechanism which includes the feed nozzle 22.

On the other hand, since the gas discharge nozzle 29 is in a position forward of the pig 1 wherein the projecting position, if the pig 1 reaching the launcher 4 from the main piping 37 is moved to a position over the spacer 24 while the channel is open at least through the electromagnetic valve 30, the compressed gas is discharged through the channel 25, communicating hole 9 and gas discharge nozzle 29, so that the pressure inside the main piping 37 is decreased. As a result, the pig 1 is brought to a halt within the launcher 4. That is, the launcher 4 is equipped with a stopping mechanism with the gas discharge nozzle 29 communicated with the inner cylinder 6.

Meanwhile, a gas feed nozzle 31 is mounted in the launcher 4 to communicate with the inner cylinder 6 for the purpose of cleaning the inside of the main piping 37 in the preparatory stage. The channel of the gas feed nozzle 31 is opened/closed by an electromagnetic valve 32. When the compressed gas is supplied from the feed nozzle 31 to the main piping 37, the residue remaining in the main pipe 37 can be preliminarily discharged beforehand. In other words, when the compressed gas is sent from the feed nozzle 31, the residue in the main piping 37 can be reduced, e.g., approximately 15–20 weight % without causing running of the pig 1.

Moreover, there is arranged a pressure sensor 33 in the piping of the gas feed nozzle 31 so as to detect the pressure decrease subsequent to the release of pressure in the main piping 37. Since the pressure in the main piping 37 is decreased in accordance with the arrival of the pig 1, the detecting signal of the pressure sensor 33 corresponds to an arrival signal of the pig 1 at the launcher 4. A piping 35 with a pressure gauge 34 is further provided and connected to the launcher 4 to monitor the pressure inside the launcher 4.

As described hereinabove, the launcher equipped with the pressing mechanism and the stopping mechanism is able to work also as a catcher.

In the meantime, a catcher 36 at the other end of the main piping 37 is, as indicated in FIG. 1, constructed in the same fashion as the above launcher 4 except for one point that the feed nozzle and the air cylinder are not provided for the preparatory cleaning of the inside of the main piping through the supply of the compressed gas. The same members of the catcher 36 as those of the launcher 4 are represented by the same reference numerals in FIG. 1. A pressure sensor 33 of the catcher 36 detects the pressure decrease as a result of the arrival of the pig 1 at the launcher 4. The detecting signal from the pressure sensor 33 of the catcher 36 corresponds to an end of cleaning. The catcher 36 of the structure as above is equipped with a pressing mechanism and a stopping mechanism, similar to the launcher 4, and therefore serves also as a launcher.

The main piping 37 is connected with a branch pipe 38 having an electromagnetic valve 39 to transport oils and fats or the like fluid to be stored. An electromagnetic valve 40 provided in the main piping 37 between the branch pipe 38 and the launcher 4 prevents the fluid-to-be-stored from being sent to the launcher 4.

The fluid-to-be-stored which is supplied through the branch pipe 38 is stored in the tank 42a via the branch pipe 41a communicated and connected with the main piping 37. Not only does the branch pipe 41a have an electromagnetic valve 43a, but also the main piping 37 has an electromagnetic valve 44a downstream of the-branched part. In the embodiment, in order to store a different kind of fluid in another tank 42b, the branch pipe 41b with an electromagnetic valve 43b is connected so as to communicate with the main piping 37, and an electromagnetic valve 44b is placed at the lower side of the stream of the branched part of the main piping 37.

As is clearly illustrated in FIG. 4, a double pipe comprised of an outer pipe 37a and an inner pipe 37b is disposed at the branched part of each branch pipe 41a, 41b branching from the main piping 37. The outer pipe 37a is longer than the pig 1 in the axial direction. The inner pipe 37b defining the main piping 37 has a communicating hole 45 formed in the shape of a slit to communicate with the branch pipe 41a, 41b.

The communicating hole 45 restricts the pig 1 from entering the branch pipe 41a, 41b. Therefore, even when the pig 1 is sent with high pressure, the pig 1 will not clog the branch pipe 38, 41a, 41b or enters the tank 42a, 42b.

Since the main piping 37 at the branched part is longer than the pig 1, the compressed gas flows into the tanks 42a, 42b through the branch pipes 41a, 41b when an expanded part at the rear end of the pig 1 relative to the advancing direction passes through the communicating hole 45 in the state where the electromagnetic valves 43a, 43b of the branch pipes 41a, 41b connected to the tanks 42a, 42b are open. As a result, the pressure inside the main piping 37 is suddenly decreased, whereby the pig 1 is stopped at the branched part. The decrease of the pressure at the branched part is detected by the pressure sensor 33 of the launcher 4, and the detecting signal from the pressure sensor 33 corresponds to the arrival signal of the pig 1 at the branched part. Therefore, if the detecting signal from the pressure sensor 33 is fed to the controller, it is possible as will be described later to control opening/closing of the electromagnetic valves 43a, 43b of the branch pipes 41a, 41b and the electromagnetic valves 44b, 44b of the main piping 37.

Accordingly, in the cleaning apparatus of the present invention, not only can the whole of the main piping 37 between the launcher 4 and catcher 36 be cleaned efficiently, but it is possible to efficiently clean only a necessary part of the main piping 37.

Figure 5:
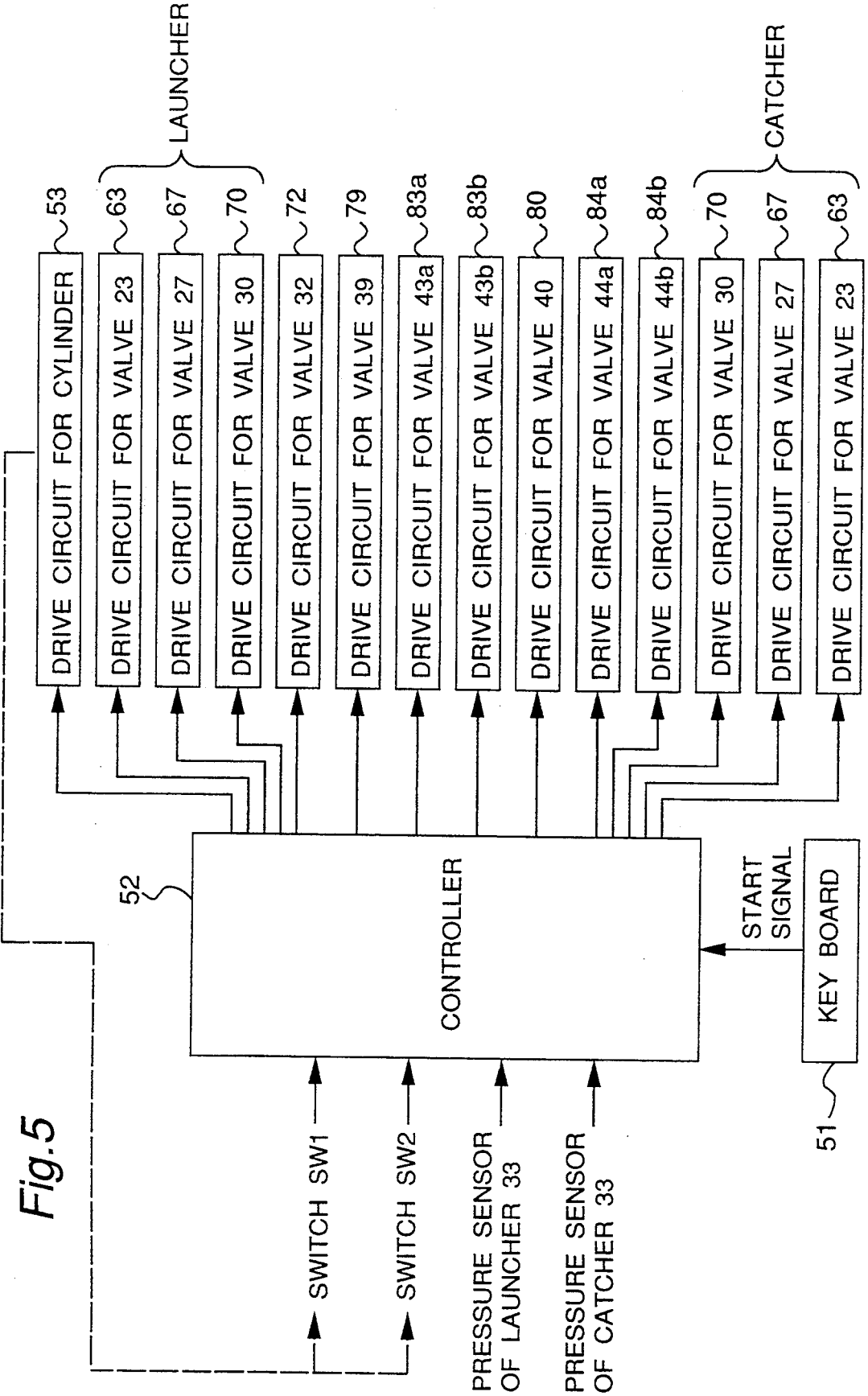
FIG. 5 is a block diagram showing the electric constitution of the apparatus of FIG. 1.
Figure 6:
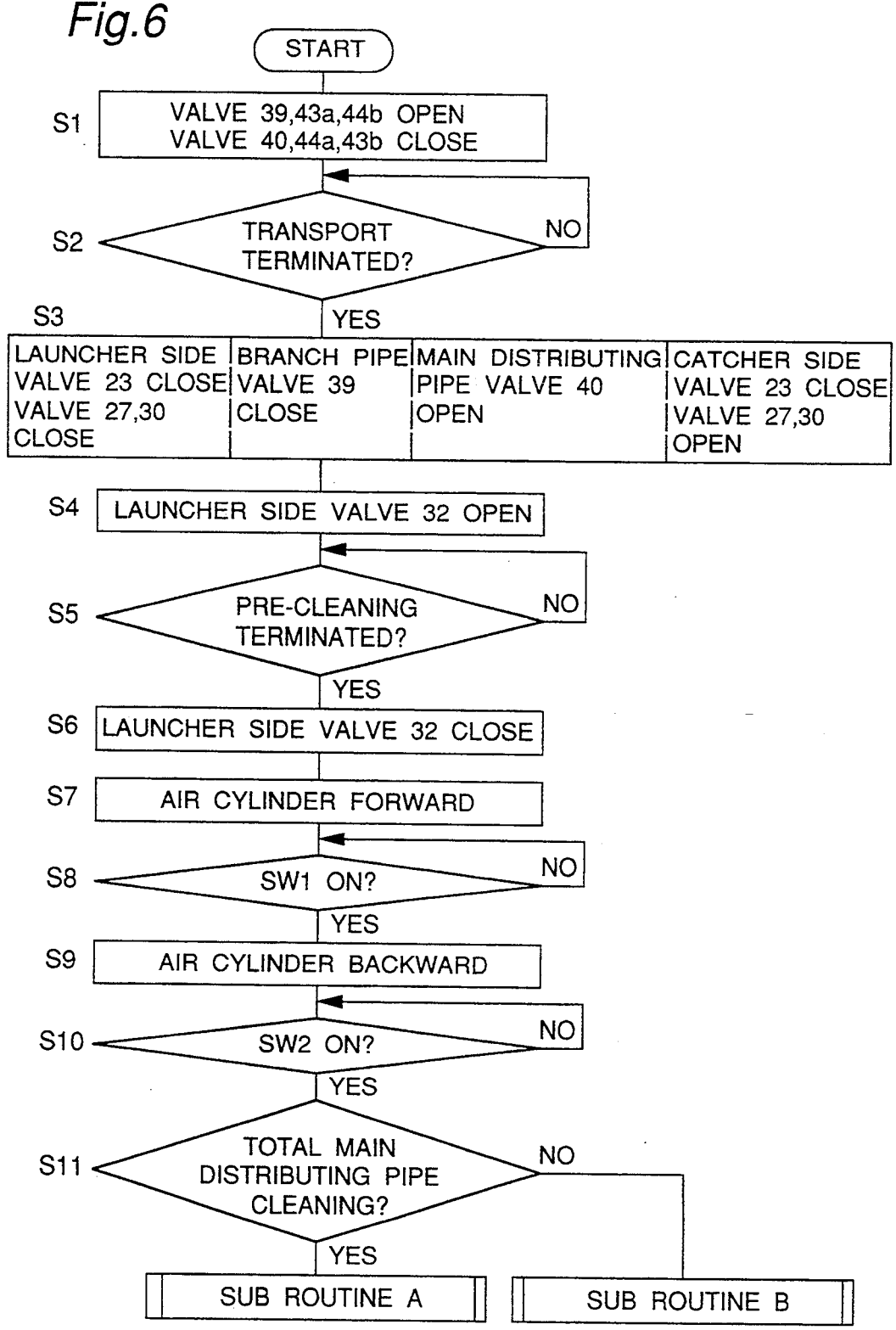
FIG. 6 is a flow chart of the operation of a controller in FIG. 5.
Figure 7:
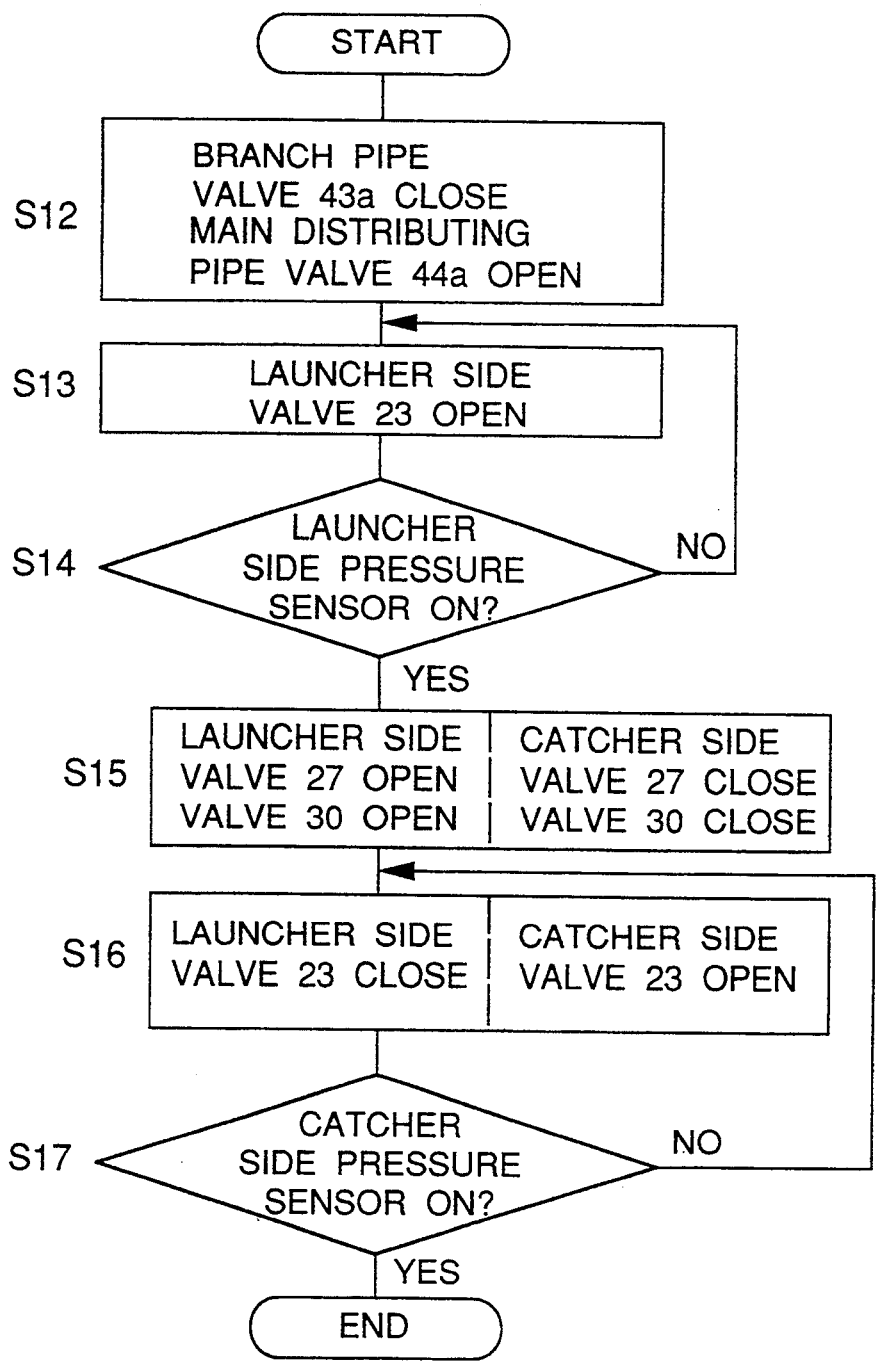
FIG. 7 is a flow chart of a sub routine A of FIG. 6.
Figure 8:
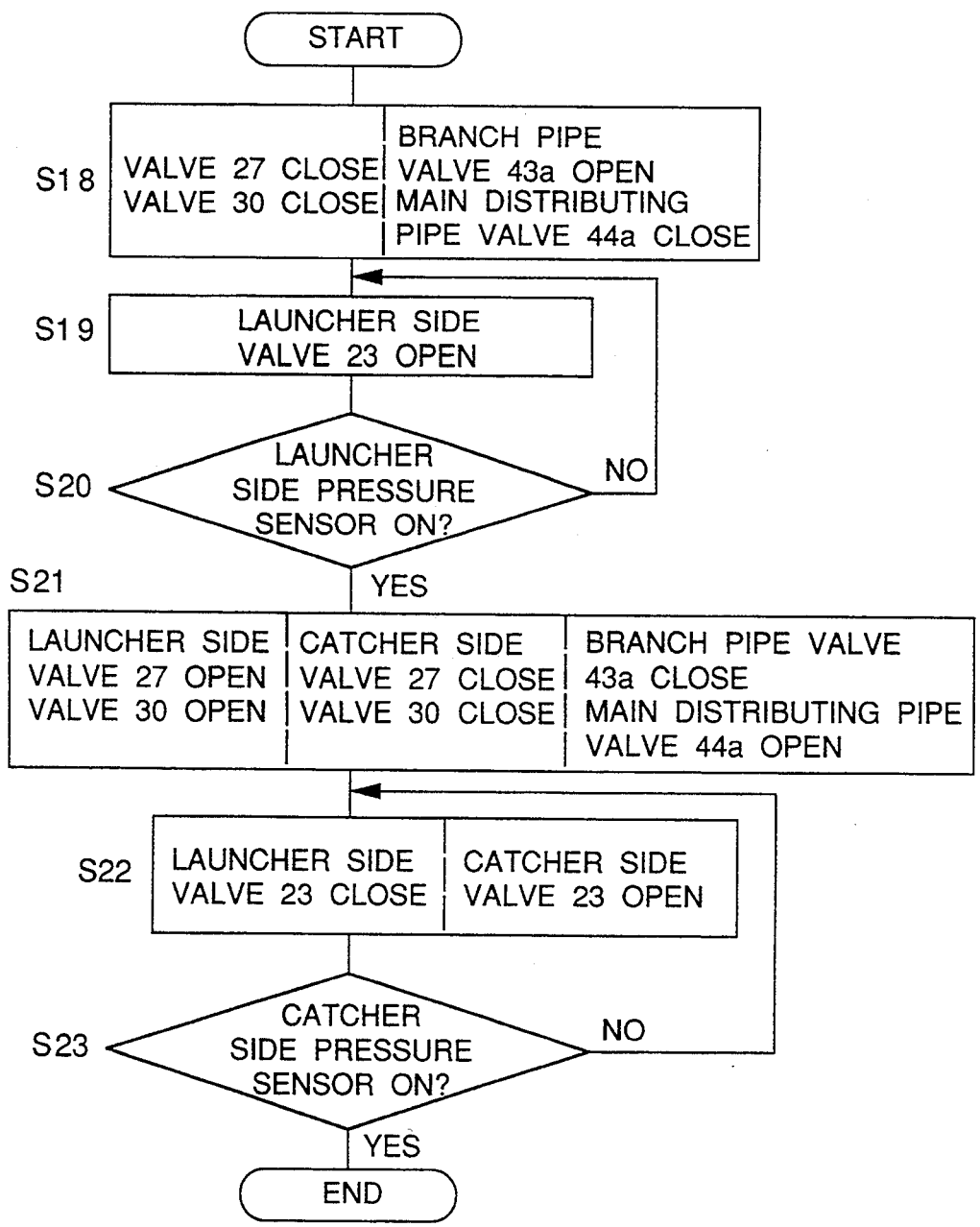
FIG. 8 is a flow chart of a sub routine B of FIG. 6.

Now, an example of the operation of the cleaning apparatus, when the main piping 37 is cleaned after a fluid-to-be-stored, for example, fats and oils, is transported and stored in the first tank 42a, will be discussed hereinbelow. FIG. 5 is a block diagram showing the electric constitution of the apparatus shown in FIG. 1, and FIG. 6 is a flow chart of the operation of a controller in FIG. 5. FIGS. 7, 8 are flow charts of sub routines A, B of FIG. 6, respectively. The sub routine A is related to a cleaning program for the total main piping, while the sub routine B is related to a cleaning program for the main piping 37 between the launcher 4 and the branched part of the first branch pipe 41a.

A selecting signal for selecting the first tank 42a is given to a controller 52 from a keyboard 51. An opening/closing signal from the controller 52 is applied to driving circuits 79, 83a, 80, 84a of the electromagnetic valves in step S1, so that the electromagnetic valves 39, 43a are opened, whereas the electromagnetic valves 40, 44a are closed. Moreover, the electromagnetic valve 43b of the second branch pipe 41b positioned at the lower side of the stream is closed in response to the opening/closing signal from the controller 52, and the second electromagnetic valve 44b of the main piping 37 is opened.

The fluid-to-be-stored is, passing through the branch pipe 38, main piping 37 and first branch pipe 41a, transported to be stored in the tank 42a.

In step S2, it is detected, based on the detecting signal from a flow rate sensor which detects the feeding amount of the fluid or a level sensor of the tank 42a, etc., whether the transportation of the fluid is finished or not. When the above sensor is in the OFF state, namely, when a predetermined amount of the fluid is not yet completely transported, the supply of the fluid is continued. The excess fluid is left in the main piping 37 due to the transportation of the fluid.

When the transportation is finished, in step S3, the electromagnetic valves are opened/closed for the purpose of preparatory cleaning. More specifically, as the opening/closing signal from the controller 52 is fed to the driving circuits 79, 80 of the electromagnetic valves, the electromagnetic valve 39 of the branch pipe 38 is closed and the electromagnetic valve 40 of the main piping 37 is opened. Since the opening/closing signal from the controller 52 is also sent to the driving circuits 63, 67, 70 of the electromagnetic valves at the side of the launcher 4, the electromagnetic valves 23, 27, 30 of the feed nozzle 22, liquid discharge nozzle 26, and gas discharge nozzle 29 are closed.

The opening/closing signal from the controller 52 is input to the driving circuits 63, 67, 70 at the side of the catcher 36 as well, whereby the electromagnetic valve 23 of the feed nozzle 22 is closed, while the electromagnetic valves 27, 30 of the liquid discharge nozzle 26 and gas discharge nozzle 29 are opened.

In step S4, the opening/closing signal of the controller 52 is supplied to a driving circuit 72, to thereby open the electromagnetic valve 32 of the feed nozzle 31 for preparatory cleaning. In consequence, the compressed gas is supplied from the feed nozzle 31 to reduce the amount of the excess fluid remaining in the main piping 37.

In step S5, whether or not the preparatory cleaning is completed is detected on the basis of the feeding amount or the feeding time of the compressed gas measured by the flow rate sensor or timer. When the preparatory cleaning is finished, the opening/closing signal of the controller 52 is supplied to the driving circuit 72 in step S6, whereby the electromagnetic valve 32 of the launcher 4 is closed.

The controller 52 sends a driving signal to a driving circuit 53 of the air cylinder 20 to push forward the air cylinder 20 in step S7.

In step S8, it is detected whether the limit switch SW1 to detect the projecting position of the pig 1 is turned ON or not. When the switch SW1 is turned ON, the air cylinder 20 is returned back in step S9. Then, in step S10, it is detected whether or not the limit switch SW2 for detecting the retracting position of the air cylinder 20 is turned ON. If the limit switch SW2 is in the ON state, it is selected through the keyboard 51 in step S11 whether or not the whole of the main piping 37 is to be cleaned.

When the total cleaning of the main piping 37 is selected through the keyboard 51, the sub routine A, is started. On the other hand, when the cleaning between the launcher 4 and the first branch pipe 41a is selected, the operation is moved to the sub routine B. The selecting signal from the keyboard 51 serves as the start signal to start cleaning.

The operation when the whole of the main piping is to be cleaned will be described with reference to FIG. 7.

When it is desired to totally clean the main piping, the opening/closing signal from the controller 52 is supplied in step S12 to the driving circuits 83a, 84b, thus closing the electromagnetic valve 43a of the first branch pipe 41a to which the fluid-to-be-stored has been transported, with the electromagnetic valve 44a of the main piping 37 open. As a result, all the electromagnetic valves 40, 44b, 44b of the main piping 37 are open and all the electromagnetic valves 39, 43a, 43b of the branch pipes 38, 43a, 43b are closed.

When the opening/closing signal is supplied from the controller 52 to the driving circuit 63, the electromagnetic valve 23 of the feed nozzle 22 of the launcher 4 is opened in step S13. The compressed gas is supplied behind the pig 1 at the projecting position of the launcher 4, and therefore the pig 1 is pushed from the launcher 4 towards the catcher 36. In accordance with the movement of the pig 1 in elastic contact with the inner wall of the main piping 37, the residue in the main piping 37 is scraped and transferred to the side of the catcher 36. The residue transferred by the pig 1 is discharged out through the channel 25, communicating hole 9 and liquid discharge nozzle 26 of the catcher 36.

When the expanded part at the rear end of the pig 1 relative to the advancing direction passes the opening part between the inner cylinder 6 and the spacer 24 of the catcher 36 and the pig 1 comes over to a position the spacer 24, the compressed gas supplied from the feed nozzle 22 is discharged through the channel path 25, communicating hole 9 and gas discharge nozzle 29. Therefore, the pressure in the catcher 36 is rapidly decreased to thereby stop the pig 1. This decrease of pressure is generated corresponding to the arrival of the pig 1. When the pig 1 reaches the catcher 36, the arrival of the pig 1 is detected by the pressure sensor 33 of the launcher 4.

In step S14, it is detected whether or not the pressure sensor 33 of the launcher 4 is ON. If the pressure sensor 33 is not turned ON, the supply of the compressed gas from the feed nozzle 22 is continued to be supplied from the feed nozzle 22 (i.e., steps S13, S14 are continuously performed). When the pressure sensor 33 is in the ON state, the electromagnetic valves are controlled to be opened/closed in a manner as follows so as to send the pig 1 towards the launcher 4.

The opening/closing signal from the controller 52 is supplied to the driving circuits 67, 70 of each of the launcher 4 and catcher 36, and in step S15, the electromagnetic valves 27, 30 of the liquid discharge nozzle 26 and gas discharge nozzle 29 of the launcher 4 are opened, while the electromagnetic valves 27, 30 of the liquid discharge nozzle 26 and gas discharge nozzle 29 of the catcher 36 are closed.

In step S16, the opening/closing signal from the controller 52 is fed to the driving circuits 63 of the launcher 4 and catcher 36, so that the electromagnetic valve 23 of the feed nozzle 22 of the launcher 4 is closed and the electromagnetic valve 23 of the feed nozzle 22 of the catcher 36 is opened. Therefore, the compressed gas is introduced from the feed nozzle 22 of the catcher 36, thus the pig 1 is pressed towards the launcher 4. When the pig 1 arrives at the launcher 4, the pressure decrease is brought about, similar to the earlier description. This pressure decrease is detected by the pressure sensor 33 of the catcher 36.

It is detected in step S17 whether or not the pressure sensor 33 of the catcher 36 is set ON. When the pressure sensor 33 is not ON, the supply of the compressed gas from the feed nozzle 22 is continued (steps S16, S17 are continued). Meanwhile, if the pressure sensor 33 of the catcher 36 is kept ON, the cleaning work is terminated.

As is clear from the above, the electromagnetic valve 23 of the feed nozzle 22 at the side of the launcher 4 is interlockingly opened/closed with the electromagnetic valves 27, 30 of the liquid discharge nozzle 26 and gas discharge nozzle 29 at the side of the catcher 36. At the same time, the electromagnetic valve 23 of the feed nozzle 22 of the catcher 36 is opened/closed in association of the electromagnetic valves 27, 30 of the liquid discharge nozzle 26 and gas discharge nozzle 29 of the launcher 4. During the one reciprocal motion of the pig 1, the controller 52 opens/closes the electromagnetic valve 23 of the feed nozzle 22 of the launcher 4 and that of the feed nozzle 22 of the catcher 36 in opposite directions. The electromagnetic operation of the valves 40, 44b, 44b of the main piping 37 is reverse to that of the electromagnetic valves 39, 43a, 43b of the branch pipes 38, 41, 41b with respect to the opening/closing movement.

Meanwhile, when the main piping is to be partially, not totally, cleaned, the cleaning apparatus of the present invention operates in a manner as will be described with reference to FIG. 8.

When cleaning of the main piping 37 between the launcher 4 and the first branch pipe 41a is selected, in step S18 in the sub routine B, the opening/closing signal from the controller 52 is sent to the driving circuits 67, 70, 83a, 84b, and therefore the electromagnetic valves 27, 30 of the discharge nozzles 26, 29 of the launcher 4 are closed, with the electromagnetic valve 43a of the first branch pipe 41a to which the fluid-to-be-stored has been transported being opened. At the same time, the electromagnetic valve 44a of the main piping 37 is closed.

In step S19, similar to step S13 in the sub routine A, as the opening/closing signal from the controller 52 is sent to the driving circuit 63, the electromagnetic valve 23 of the feed nozzle 22 of the launcher 4 is opened. The pig 1 is consequently moved from the launcher 4 towards the catcher 36 to the branched part of the branch pipe 41a where the branch pipe is connected with the first tank 42a. When the expanded part at the rear end of the pig 1 passes the communicating hole 45 of the inner pipe 37b, the compressed gas supplied through the feed nozzle 22 enters the first tank 42a through the slit of the communicating hole 45. At this time, the pressure of the compressed gas is let out and thus suddenly decreased, to thereby stop the movement of the pig 1.

Since the pressure decrease is generated in response to the arrival of the pig 1 at the first branched part, the arrival of the pig 1 at the first branched part can be detected by the pressure sensor 33 of the launcher 4. The residue transferred by the run of the pig 1 is guided into the first tank 42a through the communicating hole 45.

Similar to step S14, it is detected in step S20 whether or not the pressure sensor 33 of the launcher 4 is in the ON state. If the pressure sensor 33 is not kept ON, the compressed gas is continuously supplied from the feed nozzle 22 (steps S19, S20 are continued). When the pressure sensor 33 is kept ON, the electromagnetic valves are controlled to be opened/closed as will be described hereinbelow to move the pig 1 towards the launcher 4.

The opening/closing signal from the controller 52 is sent to the driving circuits 67, 70 in step S21 similar to step S15. As a result, the electromagnetic valves 27, 30 of the liquid discharge nozzle 26 and gas discharge nozzle 29 of the launcher 4 are opened, and the electromagnetic valves 27, 30 of the liquid discharge nozzle 26 and gas discharge nozzle 29 of the catcher 36 are closed. Moreover, in this step S21, the opening/closing signal of the controller 52 is supplied also to the driving circuits 83a, 84b, whereby the electromagnetic valve 43a of the first branch pipe 41a is closed and the electromagnetic valve 44a of the main piping 37 is opened.

In step S22, in the same manner as in step S16, as the opening/closing signal from the controller 52 is supplied to the driving circuit 63 for opening/closing the electromagnetic valves of the launcher 4 and catcher 36, the electromagnetic valve 23 of the feed nozzle 22 of the launcher 4 is closed, while the electromagnetic valve 23 of the feed nozzle of the catcher 36 is opened. Therefore, the compressed gas is supplied from the feed nozzle 22 of the catcher 36, and the pig 1 at the first branched part is pressed towards the launcher 4. The arrival of the pig 1 at the launcher 4 is detected by the pressure sensor 33 of the catcher 36.

In step S23 similar to step S17, it is detected whether the pressure sensor 33 of the catcher 36 is turned ON or not. If the pressure sensor 33 is not turned ON, the compressed gas is continuously fed from the feed nozzle 22 (steps S22, S23 are continued). When the pressure sensor 33 is ON, the cleaning work is finished.

In the case where the main piping 37 between the launcher 4 and the second branched part is to be cleaned after a fluid-to-be-stored is transported to the second tank 42b, the respective electromagnetic valves 43b, 44b of the second branch pipe 41b and main piping 37 should be opened/closed in the same fashion as the electromagnetic valves 43a, 44a of the first branch pipe 41a and main piping 37 in steps S12, S18.

It is to be noted here that the transportation of the fluid-to-be-stored into the tank or the preparatory cleaning is not necessarily automatically carried out by the controller, but may be performed by opening/closing of the valves manually. In this case, the start signal to start the cleaning work is input from the keyboard 51 to the controller 52.

Figure 9:
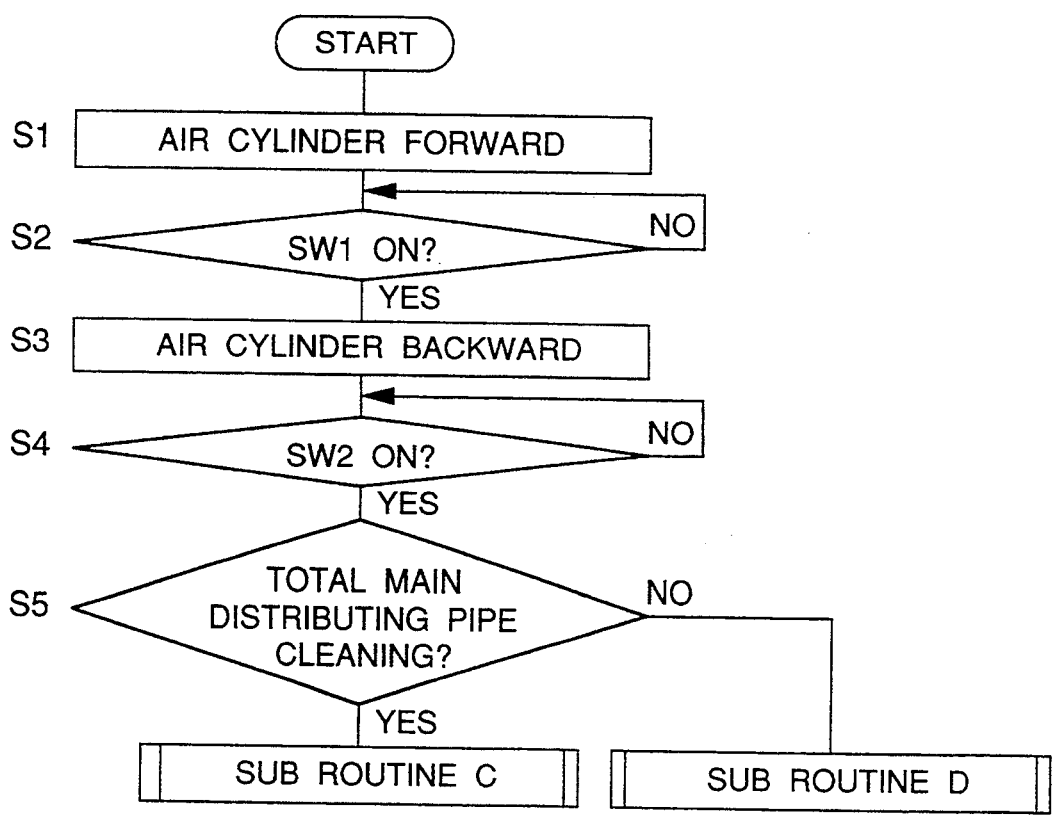
FIG. 9 is a flow chart of the operation of another controller.
Figure 10:
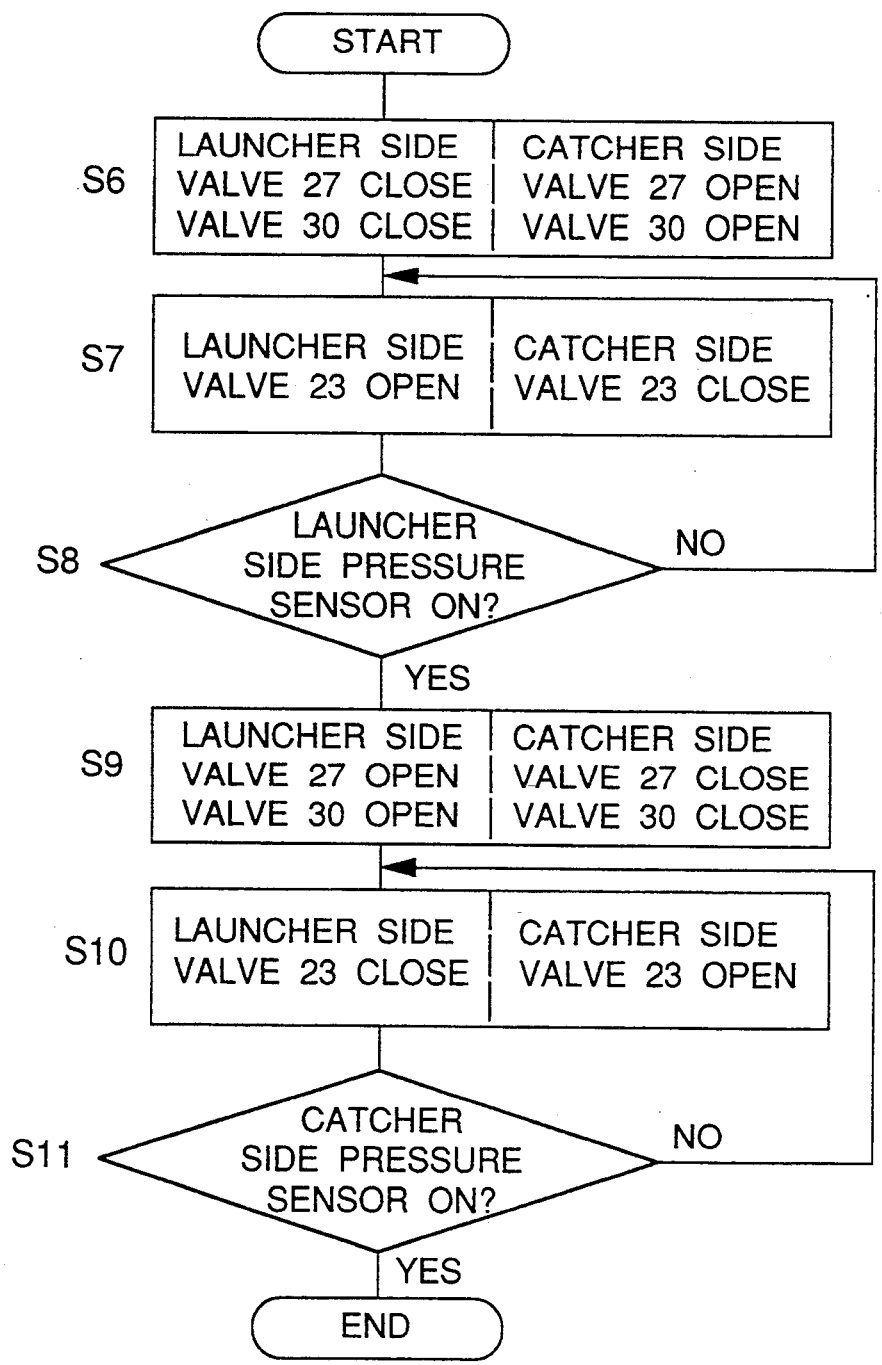
FIG. 10 is a flow chart of a sub routine C of FIG. 9.
Figure 11:
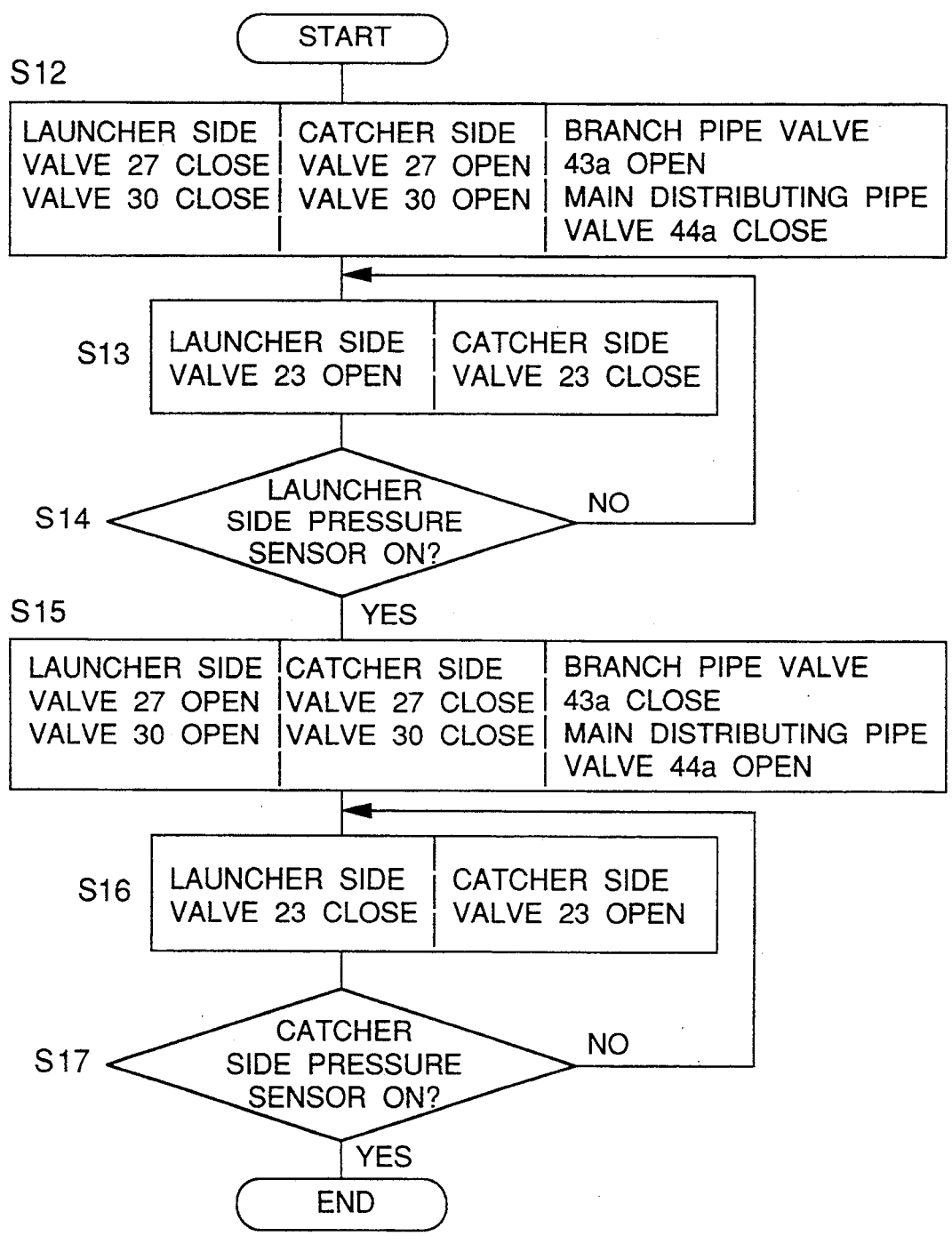
FIG. 11 is a flow chart of a sub routine D of FIG. 9.

FIG. 9 is a flow chart of the operation of a controller which controls simply the reciprocation of the pig 1. FIGS. 10 and 11 show flow charts of a sub routine C and a sub routine D of FIG. 9. The sub routine C indicates a cleaning program for cleaning the whole of the main piping, and the sub routine D is a cleaning program for cleaning the main piping 37 between the launcher 4 and the branched part of the first branch pipe 41a.

In the example of FIG. 9, the fluid-to-be-stored is transported to the tank and the excessive residue in the pipe conduit is preparatorily cleaned by manually opening/closing the electromagnetic valves, and thereafter the pig is reciprocated by the controller.

The start signal from the keyboard 51 is input to the controller 52. In step S1, the controller 52 sends a driving signal to the driving circuit 53 of the air cylinder 20, to thereby send forward the air cylinder 20.

In step S2, it is detected whether or not the limit switch SW1 to detect the projecting position of the pig is in the ON state. If the switch SW1 is in the ON state, the air cylinder 20 is retracted in step S3. Then, it is detected in step S4 whether the limit switch SW2 to detect the retracting position of the air cylinder 20 is ON or not. With the limit switch SW2 turned ON, it is selected through the keyboard 51 whether the whole of the main piping 37 is required to be cleaned.

If the total cleaning of the main piping is selected through the keyboard 51, the cleaning work is changed into the sub routine C. On the other hand, if the main piping 37 between the launcher 4 and the first branch pipe 41a is desired to be cleaned, the sub routine D is started.

The operation when the entire main piping is cleaned will be depicted with reference to FIG. 10.

When the entire main piping is to be cleaned, in step S6, the opening/closing signal from the controller 52 is supplied given to the driving circuits 67, 70 of each of the launcher 4 and catcher 36, whereby the electromagnetic valves 27, 30 of the launcher 4 are closed, while the electromagnetic valves 27, 30 of the catcher 36 are opened.

In step S7, the opening/closing signal from the controller 52 is supplied to the driving circuit Accordingly, the electromagnetic valve 23 of the feed nozzle 22 of the launcher 4 is opened while the electromagnetic valve 23 of the feed nozzle 22 of the catcher 36 is closed. The pig 1 is moved towards the catcher 36 from the launcher 4 with the supply of the compressed gas. When the pig 1 reaches the catcher 36, the pig 1 is stopped, and at the same time, the pressure is reduced. The pressure reduction is detected by the pressure sensor 33 of the launcher 4.

The opening/closing of the electromagnetic valves in steps S8–S11 is conducted in the same manner as in steps S14–S17 of the sub routine A represented in FIG. 7.

More specifically, it is detected in step S8 whether or not the pressure sensor 33 of the launcher 4 is turned ON. When the pressure sensor 33 is not turned ON, the supply of the compressed gas from the feed nozzle 22 is continued. When the pressure sensor 33 is ON, the electromagnetic valves are controlled to be opened/closed in a manner as follows to send the pig 1 towards the launcher 4.

In step S9, when the opening/closing signal from the controller 52 is sent to the driving circuits 67, 70 of the launcher 4 and catcher 36, the electromagnetic valves 27, 30 of the launcher 4 are opened, whereas the electromagnetic valves 27, 30 at the side of the catcher 36 are closed.

The opening/closing signal of the controller 52 is input to the driving circuits 63 of the launcher 4 and catcher 36 in step 10, so that the electromagnetic valve 23 of the feed nozzle 22 of the launcher 4 is closed, and the electromagnetic valve 23 of the feed nozzle 22 of the catcher 36 is opened. As a result, the compressed gas is supplied from the feed nozzle 22 of the catcher 36, to thereby send the pig 1 towards the launcher 4 with pressure. The pressure decrease given rise to when the pig 1 arrives at the launcher 4 is detected by the pressure sensor 33 of the catcher 36.

It is judged in step S11 whether or not the pressure sensor 33 of the catcher 36 is in the ON state. If the pressure sensor 33 is not in the ON state, the compressed gas is continued to be supplied from the feed nozzle 22. When the pressure sensor 33 is in the ON state, on the other hand, the cleaning work is completed.

Hereinafter will be discussed the operation when the main piping is to be partially cleaned, with reference to FIG. 11.

When the main piping 37 between the launcher 4 and the first branched part is selected to be cleaned, the opening/closing signal from the controller 52 is fed to the driving circuits 67, 70 to open/close the electromagnetic valves, in step S12 in the sub routine D. Accordingly, the electromagnetic valves 27, 30 of the liquid discharge nozzle 26 and gas discharge nozzle 29 at the side of the launcher 4 are closed, and at the same time, the electromagnetic valves 27, 30 of the liquid discharge nozzle 26 and gas discharge nozzle 29 of the catcher 36 are opened.

The opening/closing signal from the controller 52 is also supplied to the driving circuits 83a, 84a to thereby open the electromagnetic valve 43a of the first branch pipe 41a where the fluid-to-be-stored has been transported, with the electromagnetic valve 44a of the main piping 37 being closed.

In step S13, when the opening/closing signal of the controller 52 is input to the driving circuits 63 of the launcher 4 and catcher 36, the electromagnetic valve 23 of the feed nozzle 22 of the launcher 4 is opened, and the electromagnetic valve 23 of the feed nozzle 22 of the catcher 36 is closed, whereby the pig 1 is transferred. As the pig 1 arrives at the branched part of the first branch pipe 41a, the pig 1 is stopped and the pressure decrease on this occasion is detected by the pressure sensor 33 of the launcher 4.

The electromagnetic valves are opened/closed in steps S14–S17 in the same way as in steps S20–S23 of FIG. 8.

In other words, in step S14, it is detected whether or not the pressure sensor 33 of the launcher 4 is turned ON. When the pressure sensor 33 is not turned ON, the compressed gas is continued to be supplied. If the pressure sensor 33 is in the ON state, the electromagnetic valves are opened/closed as will be described hereinbelow to move the pig 1 towards the launcher 4.

In step S15, the opening/closing signal of the controller 52 is sent to the driving circuits 67, 70, thereby opening both the electromagnetic valve 27 of the liquid discharge nozzle 26 and the electromagnetic valve 30 of the gas discharge nozzle 29 at the side of the launcher 4, and closing the electromagnetic valves 27, 30 of the liquid discharge nozzle 26 and gas discharge nozzle 29 of the catcher 36.

The opening/closing signal of the controller 52 is, in step S16, fed to the driving circuits 63 of the launcher 4 and catcher 36, thereby closing the electromagnetic valve 23 of the feed nozzle 22 of the launcher 4 and opening the electromagnetic valve 23 of the feed nozzle 22 of the catcher 36. Therefore, the compressed gas is fed from the feed nozzle 22 at the side of the catcher 36, whereby the pig 1 at the first branched part is forwarded towards the launcher 4 with pressure. The arrival of the pig 1 at the launcher 4 is detected by the pressure sensor 33 of the catcher 36.

In the next step S17, similar to step S11, it is detected whether the pressure sensor 33 of the catcher 36 is ON or not. When the pressure sensor 33 is not kept ON, the supply of the compressed gas from the feed nozzle 22 is continuously carried out. However, the cleaning work is finished if the pressure sensor 33 is turned ON.

In the present apparatus, since the main piping 37 can be cleaned through reciprocation of the pig 1, it is not necessary to remove the pig 1 from the catcher 36 and install it again in the launcher 4, although it is required in the conventional method. Thus, the cleaning efficiency of the present apparatus is enhanced. Moreover, the effectiveness of removing residues from the main piping 37 is high. For instance, if the pig 1 is moved from the launcher 4 to the catcher 36 merely in one direction in a piping system to transport fats and oils, the residue is reduced generally to 0.5–1% or so. In contrast, when the pig 1 is reciprocated between the launcher 4 and catcher 36, the residue can be reduced to 0.1% or less. Therefore, even in the case where various kinds of fluid are transported into tanks, the contamination of the fluid in tanks can be remarkably decreased.

Moreover, since the branched part between the main piping 37 and the branch pipes 38, 41, 41b is constituted of a double pipe having a slit shaped communicating hole 45 formed in the inner pipe 37b to prohibit the invasion of the pig 1, the pig 1 is prevented from entering the branch pipes 38, 41, 4b or tanks 42a, 42b even when the pig 1 is transferred with high pressure. As a result, the pig 1 can be moved in a reliable manner.

The pig 1 arranged within the pipe conduit of the present cleaning apparatus may be in the form of a ball or bullet, and is not limited to the depicted structure, or spherical expanded parts may be formed at both ends of the pig. The outer diameter of the expanded part may be slightly larger than the inner diameter of the main piping, e.g., by approximately 1–5%. Moreover, a recessed part may be formed at either end of the pig so as to transmit the pressure of the compressed gas efficiently.

So long as each of the launcher and catcher is provided with a sensor for detecting the arrival of the pig and a control means for controlling the supply of the compressed gas on the basis of the detecting signal from the sensor, the structure of the launcher and catcher is not restricted to the above-described example. For instance, it is not necessary to form the liquid discharge port and the gas discharge port separately. At least one gas discharge port is enough. Further, it may be so arranged that the electromagnetic valve is mounted in the channel of at least one of the liquid discharge port and gas discharge port, and a manually-operated valve is mounted to the other port.

In addition, the gas discharge port or liquid discharge port may be provided at a point where the port is communicated with the outside air in the rear of the pig relative to the advancing direction of the pig, without installing the spacer in each inner cylinder of the launcher and catcher. In this case, since the gas discharge port, etc. is not shut by the pig 1, the pig can be smoothly moved to the launcher or catcher, and moreover, the compressed gas can be smoothly discharged out at the arrival of the pig to thereby stop the pig at the launcher or catcher.

The gas discharge port and the liquid discharge port of the catcher are not necessarily required in the case where only the main piping between the launcher and the branch pipe, rather than the entire main piping, is to be cleaned.

When necessary, the catcher may be provided with an air cylinder and a feed port to supply the compressed gas for preparatory cleaning, in a manner similar to the launcher.

The reciprocation of the pig 1 is not necessary to be automatically conducted by the controller, and may be executed by manually opening/closing the valves. Moreover, the pig 1 is not needed to be automatically moved to the projecting position by the air cylinder as above or a hydraulic cylinder, but may be manually moved by a push rod or the like.

It is possible to detect the arrival of the pig at the catcher or launcher by various kinds of sensors such as a flow rate sensor mounted, e.g., to the gas discharge nozzle, or a touch sensor or an optical sensor mounted to the catcher or launcher. How to detect the arrival of the pig may be selected based on the relationship between the pig and the compressed gas. For example, if a magnetic body is integrally provided inside the pig, a magnetic sensor can be utilized. On the other hand, if a heating gas or cooling gas is employed as the compressed gas, the arrival of the pig can be detected by a temperature sensor of the gas discharge nozzle, etc. A non-contacting sensor is preferable for the case where it is feared that the sensor will become dirty due to the fats and oils or the like.

In the foregoing embodiment, the sensor is provided in each of the launcher and catcher. However, the sensor may be positioned at a suitable position of the piping system, for example, in the main piping so long as the arrival of the pig can be detected.

Although the detecting signal from the pressure sensor of the catcher is utilized as the stop signal in the above embodiment to thereby reciprocate the pig once, since the launcher functions as a catcher and the catcher functions as a launcher, the pig 1 may be reciprocated a plural number of times based on the detecting signals of the sensors of the catcher and launcher. It is also possible for the pig 1 to move at least once in one direction on the basis of the detecting signal from the sensor of the catcher or launcher after reciprocating at least once.

The compressed fluid for sending the pig with pressure is not limited to compressed gas, but may be suitably selected in accordance with the kind of the fluid-to-be-stored. By way of example, a pressurized liquid may be employed. If there is a fear that the properties of the fluid-to-be-stored will change during the transportation through the pipe conduit, an inert gas such as nitrogen gas or the like is generally used as the compressed fluid.

The cleaning apparatus of the present invention is applicable to a pipe conduit without branch pipes. If the pipe conduit includes branch pipes, the communicating hole formed in the inner pipe of the double pipe constituting the branched part may be as large as desired, so long as it can hinder the invasion of the pig into the branch pipe. It need not be restricted to being formed as a slit; a circular, polygonal or ellipsoidal hole may be formed. Moreover, if at least the inner pipe of the double pipe is longer than the pig, the compressed fluid can be discharged through the communicating hole, and therefore the outer pipe can be short.

The cleaning apparatus of a piping according to the present invention is provided with the sensor to detect the arrival of the pig at the catcher and the control means for transferring the pig with pressure from the catcher towards the launcher based on the detecting signal from the sensor. Therefore, the pig can be reciprocated within the pipe conduit, and the interior of the pipe conduit can be cleaned efficiently.

In the case where each of the launcher and catcher is provided with the sensor and the control means, the arrival of the pig both at the .catcher and at the launcher can be detected. Therefore, the pig can be further moved at least once in one direction after the pig has been reciprocated at least once.

Even when the pipe conduit is constituted of the main piping and branch pipes, the pig can be prevented by the communicating hole of the inner pipe from entering the branch pipes, so that the interior of the main piping can be surely cleaned.

If the launcher is provided at either end of the main piping, and the branched part between the main piping and branch pipe is constituted of a double pipe having an outer pipe and an inner pipe having the communicating hole, and moreover the control means is set in the branched part, the pig can be reciprocated not only in the whole of the main piping, but at a necessary point of the main piping. Accordingly, it becomes possible to clean the main piping partially, thus enhancing the cleaning efficiency.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An apparatus for cleaning a piping, comprising:
a pipe conduit;
a pig arranged in said pipe conduit;
a launcher disposed in communication with a first end of said pipe conduit for transferring said pig through the pipe conduit toward a second end thereof;
a catcher disposed in communication with said second end of said pipe conduit for receiving said pig;
a first sensor for detecting the arrival of said pig at said catcher and generating a first signal indicative of the arrival of said pig at said catcher;
a control means for receiving said first signal from said first sensor and, upon receipt of said first signal, causing supply of compressed fluid to thereby transfer said pig with pressure from said catcher towards said launcher;
wherein said pipe conduit comprises a main piping arranged between said launcher and said catcher, and a branch pipe connected to said main piping by a branched part and branching from said main piping; and
wherein said branched part has a double pipe structure comprising an outer pipe and an inner pipe, said inner pipe constituting a portion of said main piping and having a communicating hole formed therein to be communicated with said branch pipe to thereby restrict invasion of said pig into said branch pipe.

2. The apparatus as set forth in claim 1, further comprising
a second sensor for detecting the arrival of said pig at said launcher and generating a second signal indicative of the arrival of said pig at said launcher; and
wherein said control means is further operable to receive said second signal and, upon receipt of said second signal, to cause supply of compressed fluid to thereby transfer said pig with pressure in a direction from said launcher toward said catcher.

3. An apparatus for cleaning a piping, comprising:
a pipe conduit;
a pig arranged in said pipe conduit;
a launcher disposed in communication with a first end of said pipe conduit for transferring said pig through the pipe conduit toward a second end thereof;
a catcher disposed in communication with said second end of said pipe conduit for receiving said pig;
a first sensor for detecting the arrival of said pig at said catcher and generating a first signal indicative of the arrival of said pig at said catcher;
a control means for receiving said first signal from said first sensor and, upon receipt of said first signal, causing supply of compressed fluid to thereby transfer said pig with pressure from said catcher towards said launcher;
wherein said launcher has a discharge port through which said compressed fluid is discharged to thereby stop said pig, and a feed port through which the compressed fluid is supplied to transfer said pig with pressure;
wherein said catcher has a discharge port through which said compressed fluid is discharged to thereby stop said pig, and a feed port through which the compressed fluid is supplied to transfer said pig with pressure;
wherein a second sensor is provided for detecting the arrival of said pig at said launcher subsequent to discharge of the compressed fluid from said discharge port; and
wherein said control means comprises a valve mechanism which, in response to a start signal to start a cleaning operation, closes a channel of said discharge port of the launcher and a channel of said feed port of the catcher, and opens a channel of said feed port of the launcher and a channel of said discharge port of the catcher, and, in response to a detecting signal from said first sensor, closes the channel of said feed port of the launcher and the channel of said discharge port of the catcher, and opens the channel of said discharge port of the launcher and the channel of said feed port of the catcher.

4. The apparatus as set forth in claim 3, wherein
said control means is further operable to receive a second signal from said second sensor and, upon receipt of said second signal, to cause supply of compressed fluid to thereby transfer said pig with pressure in a direction from said launcher to said catcher.

5. An apparatus for cleaning a piping, comprising:
a main piping;
first and second launchers disposed in communication with opposite ends of said main piping, respectively, to transfer a pig through said main piping;
a branch pipe connected to said main piping by a branched part and branching from said main piping, wherein the branched part has a double pipe structure comprising an outer pipe and an inner pipe, said inner pipe being longer than the pig and constituting a portion of said main piping, said inner pipe having a communicating hole formed therein to be communicated with said branch pipe to thereby restrict the invasion of the pig into said branch pipe;
a first sensor for detecting the arrival of said pig at said branched part from one of said launchers and generating a first detecting signal indicative of the arrival of said pig at said branched part; and
a control means for causing supply of compressed fluid from the other Of said launchers based on said first detecting signal from said first sensor to thereby transfer said pig with pressure towards said one of said launchers.

6. The apparatus as set forth in claim 5, wherein
each of said first and second launchers has a feed port for feeding compressed fluid to transfer said pig with pressure, and wherein said one of said launchers has a discharge port to discharge the compressed fluid to thereby stop said pig; and said control means comprises a valve mechanism which, in response to a start signal to start a cleaning operation, opens a channel of said feed port of said one of said launchers and a channel of said branch pipe, and closes a channel of said discharge port of said one of said launchers, a channel of said main piping at a position between said branched part and the other of said launchers, and a channel of said feed port of the other of said launchers, and, in response to said first detecting signal from said first sensor, opens the channel of said discharge port, the channel of said main piping and the channel of said feed port of the other of said launchers, and closes the channel of said feed port of said one of said launchers and the channel of said branch pipe.

7. The apparatus as set forth in claim 5, wherein
each of said first and second launchers has a feed port for feeding compressed fluid to transfer said pig with pressure and has a discharge port to discharge the compressed fluid to thereby stop said pig, and wherein a second sensor is provided for detecting the arrival of said pig at said one of said launchers; and said control means comprises a valve mechanism which, in response to a start signal to start a cleaning operation, opens a channel of said feed port of said one of said launchers, a channel of said branch pipe and a channel of said discharge port of the other of said launchers, and closes the channel of said discharge port of said one of said launchers, the channel of said main piping at a position between said branched part and said other of said launchers, and the channel of said feed port of the other of said launchers, and, in response to said first detecting signal from said first sensor, opens the channel of said discharge port of said one of said launchers, the channel of said main piping and the channel of said feed port of the other of said launchers, and closes the channel of said feed port of said one of said launchers, the channel of said branch pipe and the channel of said discharge port of the other of said launchers.

* * * * *